(12) United States Patent
Van Leeuwen

(10) Patent No.: US 12,463,794 B2
(45) Date of Patent: Nov. 4, 2025

(54) HIGH-SPEED CIRCUIT COMBINING AES AND SM4 ENCRYPTION AND DECRYPTION

(71) Applicant: Rambus Inc., San Jose, CA (US)

(72) Inventor: Pascal Van Leeuwen, Tilburg (NL)

(73) Assignee: Rambus Inc., San Jose, CA (US)

( * ) Notice: Subject to any disclaimer, the term of this patent is extended or adjusted under 35 U.S.C. 154(b) by 145 days.

(21) Appl. No.: 18/039,865

(22) PCT Filed: Nov. 30, 2021

(86) PCT No.: PCT/US2021/061247
§ 371 (c)(1),
(2) Date: Jun. 1, 2023

(87) PCT Pub. No.: WO2022/125337
PCT Pub. Date: Jun. 16, 2022

(65) Prior Publication Data
US 2024/0097880 A1    Mar. 21, 2024

Related U.S. Application Data

(60) Provisional application No. 63/122,583, filed on Dec. 8, 2020.

(51) Int. Cl.
*H04L 9/00* (2022.01)
*H04L 9/06* (2006.01)

(52) U.S. Cl.
CPC ................. *H04L 9/0631* (2013.01)

(58) Field of Classification Search
CPC ............. H04L 9/0631; H04L 2209/122; H04L 2209/125; H04L 2209/24; G09C 1/00
See application file for complete search history.

(56) References Cited

U.S. PATENT DOCUMENTS

| 7,030,577 B2 | 4/2006 | Kulish et al. |
| 2015/0067302 A1 | 3/2015 | Gueron |

(Continued)

OTHER PUBLICATIONS

EP Extended European Search Report with Mail Date Sep. 19, 2024 re: EP Appln. No. 21904126.6. 7 pages.

(Continued)

*Primary Examiner* — Syed M Ahsan
(74) *Attorney, Agent, or Firm* — The Neudeck Law Firm, LLC

(57) ABSTRACT

Disclosed embodiments relate to cipher accelerator circuit comprising: a first affine transformation circuit generating a first data block from an input data block, a SM4 S-box circuit configured to perform a first byte S-box operation according to a SM4 cipher and using a SM4 S-box table, the SM4 S-box operation being applied to the first transformed data block to obtain a substituted data block; and a second affine transformation circuit generating a second data block from the substituted data block, wherein the first and second affine transformation circuits are configured to perform multiplication of the substituted data block by a respective matrix and addition of a respective translation vector, and wherein the first and second affine transformations circuits are configured such that the second transformed data block is equal to the input data block processed by a second S-box operation according to another symmetric cipher using S-box tables.

20 Claims, 9 Drawing Sheets

(56) References Cited

U.S. PATENT DOCUMENTS

| | | |
|---|---|---|
| 2019/0044699 A1 | 2/2019 | Satpathy et al. |
| 2019/0245679 A1* | 8/2019 | Suresh .................... G09C 1/00 |
| 2019/0372753 A1 | 12/2019 | Dorrendorf et al. |
| 2019/0386815 A1 | 12/2019 | Satpathy et al. |

OTHER PUBLICATIONS

Bi, Qiangjia et al., "DPR Based AES/SM4 Encryption Highly Efficient Implementation", Proceedings of the World Congress on Engineering and Computer Science 2018, vol. I., WCECS 2018. Oct. 23-25, 2018, San Francisco, USA. Downloaded from: http://www.iaeng.org/publication/WCECS2018/WCECS2018_pp6-10.pdf. 5 pages.

Notification of Transmittal of the International Search Report and the Written Opinion of the International Searching Authority, or the Declaration with Mail Date Feb. 15, 2022 re: Int'l Appln. No. PCT/US2021/061247. 12 pages.

\* cited by examiner

HIGH-SPEED CIRCUIT COMBINING AES AND SM4 ENCRYPTION AND DECRYPTION

BACKGROUND

Cipher algorithms (also referred to as "ciphers") are used to encrypt and decrypt data. Modern cipher algorithms perform calculations on very large numbers (that are used as the cryptographic key) to maintain the integrity, secrecy, and authenticity of a message. The messages may be in the form of individual bits or blocks of bits. Ciphers can use either symmetric keys (where the same key is used to encrypt and decrypt a message) or asymmetric keys (where different keys are used for the encryption and decryption). Ciphers using symmetric keys notably include AES (Advanced Encryption Standard) and SM4 (the Chinese National Standard for Wireless LAN WAPI). AES is extensively supported on many platforms across multiple features and AES acceleration hardware.

Most modern symmetric ciphers such as AES and SM4 are typically designed as a series of rounds, each round consisting of a series of linear operations, followed by a reversible non-linear transformation implemented by a look-up table also called "substitution box" (S-box), possibly followed by additional linear operations. The S-box transformation is typically applied to every 8-bit block of the input. However AES and SM4 ciphers involve different numbers of rounds, different S-boxes as well as rotate, scaling, and mixing operations necessitating separate hardware implementations or firmware code.

The ciphers can be implemented in hardware, software, or a combination of hardware and software. Hardware implementations were proposed to accelerate the computations required by AES. There is a need for an efficient, unified hardware implementation of AES and SM4 ciphers.

BRIEF DESCRIPTION OF THE DRAWINGS

In the drawings, each identical or nearly identical component that is illustrated in various figures is represented by a like numeral. For purposes of clarity, not every component may be labeled in every drawing. In the drawings.

DETAILED DESCRIPTION

Figure 1:
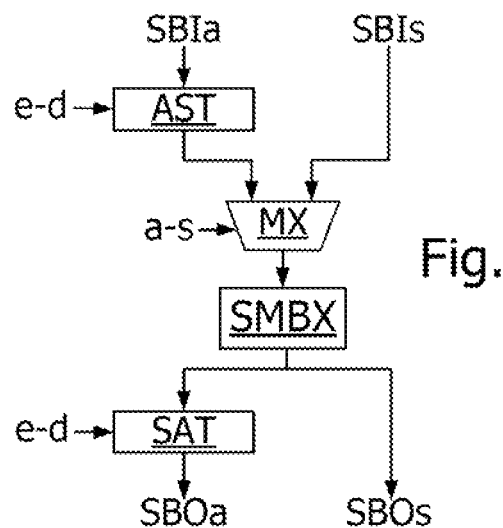
FIG. 1 block diagram illustrating an S-box circuit of a unified cipher hardware accelerator according to some embodiments.

Previous solutions for implementing block ciphers such as AES and SM4 include either implementing them using software/micro-code or to design dedicated hardware accelerators for each individual block cipher. Such software/micro-code implementations are usually unable to meet desired performance requirements. At the same time, including in a circuit a dedicated hardware accelerator for each block cipher increases product costs, in terms of silicon area and leakage power, and also brings about a need for significant design and validation efforts. In one aspect, this disclosure proposes a unified hardware accelerator to allow hardware acceleration for both AES and SM4 ciphers with minimal impact to performance.

The AES and SM4 ciphers are similar in several aspects. For example, both ciphers utilize symmetric, secret keys to perform both encryption and decryption of data represented by Galois fields $GF(2^8)$ (i.e., finite fields) of identical lengths, differing only by the definitions of their respective polynomials. Furthermore, both ciphers operate on 16-byte blocks (128 bit-blocks) of data and perform multiple rounds (10 to 14 for AES and 32 for SM4) where each round include a byte substitution operation and a permutation operation to transform input data during encryption or decryption. The byte substitution operation performs a "confusion" operation by obscuring the relationship between a key value and the information being encrypted or decrypted, and the permutation operation performs a "diffusion" operation by shuffling, transposing, and mixing bits of the key value and the input data being encrypted or decrypted. Decryption is similar to encryption and AES decryption involves reversing the operations used for encryption.

The byte substitution operation is generally implemented using a look-up table called "S-box". AES cipher uses two S-boxes of 256 bytes for encryption and decryption, respectively. SM4 cipher uses one S-box for encryption or decryption and for generating round keys of 32-bits from an encryption key using a key scheduling algorithm expanding the encryption key.

Disclosed embodiments describe a unified hardware accelerator for AES and SM4 ciphers. Disclosed embodiments use common S-box tables to save area and reduce cost. The disclosed unified AES/SM4 encrypt/decrypt hardware accelerator is expected to provide a significant area improvement over using separate AES/SM4 implementations.

Although AES and SM4 ciphers may perform similar byte substitution operations (S-box) operations, they use different Galois field $GF(2^8)$ reduction polynomials. AES cipher may use the $GF(2^8)$ reduction polynomial $x^8+x^4+x^3+x+1$, while SM4 cipher may use the $GF(2^8)$ reduction polynomial $x^8+x^7+x^6+x^5+x^4+x^2+1$. The choice of reduction polynomial differentiates the logic for Galois Field multiplications and inverse computations, thus requiring the use of separate circuits for AES and SMS4 hardware implementations. Implementing separate dedicated hardware accelerators for AES and SMS4 is clumsy and inefficient and may result in significant area and power overhead.

The embodiments described herein reduce circuit area by avoiding separate hardware for each of AES and SM4 ciphers. Instead, disclosed embodiments address AES/SM4 encryption and decryption using a single unified hardware accelerator. AES and SM4 ciphers include a common main component performing the S-box operations which may include the most area and performance critical operations.

FIG. 1 is a block diagram illustrating an S-box circuit of a unified cipher hardware accelerator, according to some embodiments. The S-box circuit includes two inputs receiving respectively a data block SBIa from an AES datapath, and a data block SBIs from a SM4 datapath. The S-box circuit further includes two outputs providing data blocks SBOa, SBOs respectively to the AES datapath and SM4 datapath. The input SBIa is connected to an affine transformation circuit AST for transforming the AES data block SBIa from the AES encrypt or decrypt domain as defined by the AES S-boxes to the SM4 domain as defined by the SM4 S-box. The S-box circuit further includes a multiplexer MX for selecting one or the other of the output of transformation circuit AST and the input data block SBIs. Multiplexer MX is controlled by signal a-s for selecting an input datapath, AES or SM4. The output of multiplexer MX is connected to a SM4 S-box SMBX. The output of S-box SMBX provides the SM4 output data block SBOs and is further processed by an affine transformation circuit SAT for transforming the output data block resulting from the S-box SMBX from the SM4 domain to the AES encrypt or decrypt domain. The output of transformation circuit SAT provides the AES output data block SBOa.

The affine transformation circuits AST, SAT receive a signal e-d specifying the operation, encryption or decryption, to be performed, the affine transformations to be applied to the input data of the circuits AST, SAT being different for encryption and decryption.

According to some embodiments, the data SBIa, SBIs, SBOa, SBOs are bytes and the affine transformations are defined by:

$$s = M \cdot b + c, \tag{1}$$

where s is an output byte of the affine transformation, M is a 8×8-bit matrix, b is an input byte of the affine transformation operation and c is a constant byte defining a translation vector. The affine transformations performed by circuit AST are in at least one example as follows:

$$\begin{vmatrix} s_0 \\ s_1 \\ s_2 \\ s_3 \\ s_4 \\ s_5 \\ s_6 \\ s_7 \end{vmatrix} = \begin{vmatrix} 1 & 1 & 0 & 1 & 1 & 1 & 0 & 0 \\ 0 & 1 & 0 & 0 & 0 & 1 & 1 & 0 \\ 1 & 1 & 0 & 1 & 0 & 0 & 1 & 1 \\ 0 & 1 & 0 & 1 & 1 & 0 & 1 & 0 \\ 0 & 0 & 1 & 1 & 1 & 0 & 0 & 1 \\ 0 & 1 & 1 & 0 & 0 & 1 & 0 & 0 \\ 0 & 1 & 0 & 0 & 1 & 0 & 1 & 1 \\ 1 & 0 & 1 & 0 & 1 & 1 & 0 & 1 \end{vmatrix} \begin{vmatrix} b_0 \\ b_1 \\ b_2 \\ b_3 \\ b_4 \\ b_5 \\ b_6 \\ b_7 \end{vmatrix} + \begin{vmatrix} 1 \\ 0 \\ 1 \\ 0 \\ 1 \\ 1 \\ 1 \\ 0 \end{vmatrix} \tag{2}$$

for encryption, where $b_i$ (i=0 ... 7) are bits of byte b, and $s_i$ (i=0 ... 7) are bits of output byte s, and for decryption:

$$\begin{vmatrix} s_0 \\ s_1 \\ s_2 \\ s_3 \\ s_4 \\ s_5 \\ s_6 \\ s_7 \end{vmatrix} = \begin{vmatrix} 0 & 0 & 1 & 0 & 0 & 0 & 1 & 1 \\ 1 & 1 & 0 & 0 & 0 & 1 & 1 & 1 \\ 0 & 0 & 0 & 0 & 1 & 1 & 0 & 1 \\ 0 & 0 & 1 & 1 & 0 & 0 & 1 & 0 \\ 1 & 0 & 1 & 1 & 1 & 1 & 1 & 0 \\ 0 & 1 & 1 & 0 & 1 & 0 & 1 & 1 \\ 0 & 0 & 0 & 1 & 1 & 0 & 0 & 1 \\ 1 & 1 & 0 & 0 & 1 & 1 & 1 & 0 \end{vmatrix} \begin{vmatrix} b_0 \\ b_1 \\ b_2 \\ b_3 \\ b_4 \\ b_5 \\ b_6 \\ b_7 \end{vmatrix} + \begin{vmatrix} 0 \\ 1 \\ 0 \\ 1 \\ 0 \\ 1 \\ 0 \\ 0 \end{vmatrix} \tag{3}$$

Affine transformations performed by circuit SAT are in the example of equations (2) and (3) as follows:

$$\begin{vmatrix} s_0 \\ s_1 \\ s_2 \\ s_3 \\ s_4 \\ s_5 \\ s_6 \\ s_7 \end{vmatrix} = \begin{vmatrix} 0 & 1 & 1 & 1 & 0 & 1 & 1 & 0 \\ 0 & 0 & 1 & 1 & 1 & 0 & 1 & 0 \\ 0 & 1 & 0 & 0 & 0 & 1 & 1 & 1 \\ 1 & 1 & 0 & 0 & 1 & 1 & 1 & 1 \\ 1 & 1 & 0 & 0 & 1 & 1 & 1 & 0 \\ 1 & 1 & 0 & 1 & 1 & 0 & 0 & 1 \\ 1 & 0 & 1 & 0 & 1 & 0 & 0 & 1 \\ 0 & 0 & 0 & 0 & 1 & 1 & 1 & 1 \end{vmatrix} \begin{vmatrix} b_0 \\ b_1 \\ b_2 \\ b_3 \\ b_4 \\ b_5 \\ b_6 \\ b_7 \end{vmatrix} + \begin{vmatrix} 1 \\ 1 \\ 1 \\ 1 \\ 0 \\ 1 \\ 0 \\ 1 \end{vmatrix} \tag{4}$$

for encryption and for decryption:

$$\begin{vmatrix} s_0 \\ s_1 \\ s_2 \\ s_3 \\ s_4 \\ s_5 \\ s_6 \\ s_7 \end{vmatrix} = \begin{vmatrix} 1 & 1 & 0 & 0 & 0 & 0 & 1 & 0 \\ 0 & 0 & 1 & 0 & 1 & 0 & 1 & 1 \\ 0 & 1 & 1 & 0 & 0 & 1 & 0 & 1 \\ 0 & 0 & 0 & 1 & 0 & 0 & 1 & 0 \\ 0 & 1 & 0 & 1 & 1 & 0 & 0 & 0 \\ 0 & 0 & 0 & 0 & 1 & 0 & 1 & 1 \\ 0 & 1 & 1 & 1 & 0 & 1 & 0 & 0 \\ 1 & 0 & 1 & 0 & 0 & 1 & 0 & 1 \end{vmatrix} \begin{vmatrix} b_0 \\ b_1 \\ b_2 \\ b_3 \\ b_4 \\ b_5 \\ b_6 \\ b_7 \end{vmatrix} + \begin{vmatrix} 1 \\ 1 \\ 0 \\ 1 \\ 0 \\ 1 \\ 1 \\ 0 \end{vmatrix} \tag{5}$$

Other matrices M, M1 and constant bytes c, c1 can be found to transform data from AES Galois field to SM4 Galois field and reversely.

The circuit of FIG. 1 may be duplicated to simultaneously process each byte of a data block for example of 32 or 128 bits.

Figure 2:
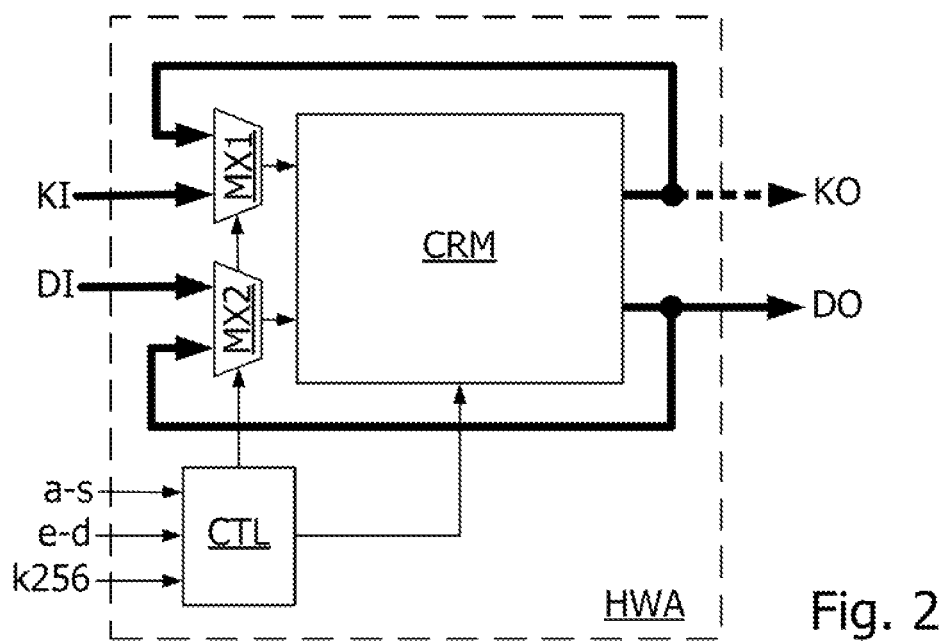
FIG. 2 is a block diagram of a unified hardware accelerator performing both AES and SM4 encryption and decryption, according to some embodiments.

FIG. 2 is a block diagram illustrating a cipher hardware accelerator HWA, according to some embodiments. Cipher accelerator HWA includes a combined AES/SM4 round module CRM that performs round processing and key expansion (also called "key schedule"). AES cipher performs 16 S-box operations at each round for data processing and other S-box operations for key schedule. SM4 performs 4 S-box operations at each round for data processing and 4 more S-box operations for key schedule. Round module CRM is configured to perform 16 S-box operations such that it can perform two rounds of SM4 cipher and SM4 key schedule and one AES round. As shown in FIG. 2, cipher accelerator HWA receives an input data block DI and a key block KI and outputs a data block DO and a round key block KO. Cipher accelerator HWA further includes multiplexers MX1, MX2 that select data to be provided to round module CRM between the input data block DI and key block KI on the one hand and on the other hand output data block DO and output key block KO.

Round module CRM and multiplexers MX1, MX2 are managed by a control circuit CTL receiving a first signal a-s for selecting the cipher, AES or SM4, to be performed, and a second signal e-d for selecting encryption or decryption. A third signal may be received by control circuit CTL to specify whether the input key block KI is encoded with 128 bits or 256 bits in case of AES cipher. Control circuit CTL manages the number of rounds to be performed (i.e. the number of times round module CRM is activated). To that purpose control module CTL provides control signals to round module CRM and multiplexers MX1, MX2. Multiplexers MX1, MX2 are controlled by the control circuit to provide the input data block DI and key KI to round module CRM at a first round. At subsequent rounds, output data block DO and key KO are provided to the input of round module CRM.

The last round keys KO used for encryption may be output or stored by the round module CRM in view of a subsequent decryption, SM4 and AES ciphers using the last round keys generated when a data block is encrypted to decrypt the data block.

Instead of looping the outputs of round module CRM to the inputs thereof, round module CRM may be duplicated in a hardware pipeline receiving the data block DI to be encrypted or decrypted and the key block KI to be used, and providing the encrypted, respectively decrypted data block DO.

Figure 3:
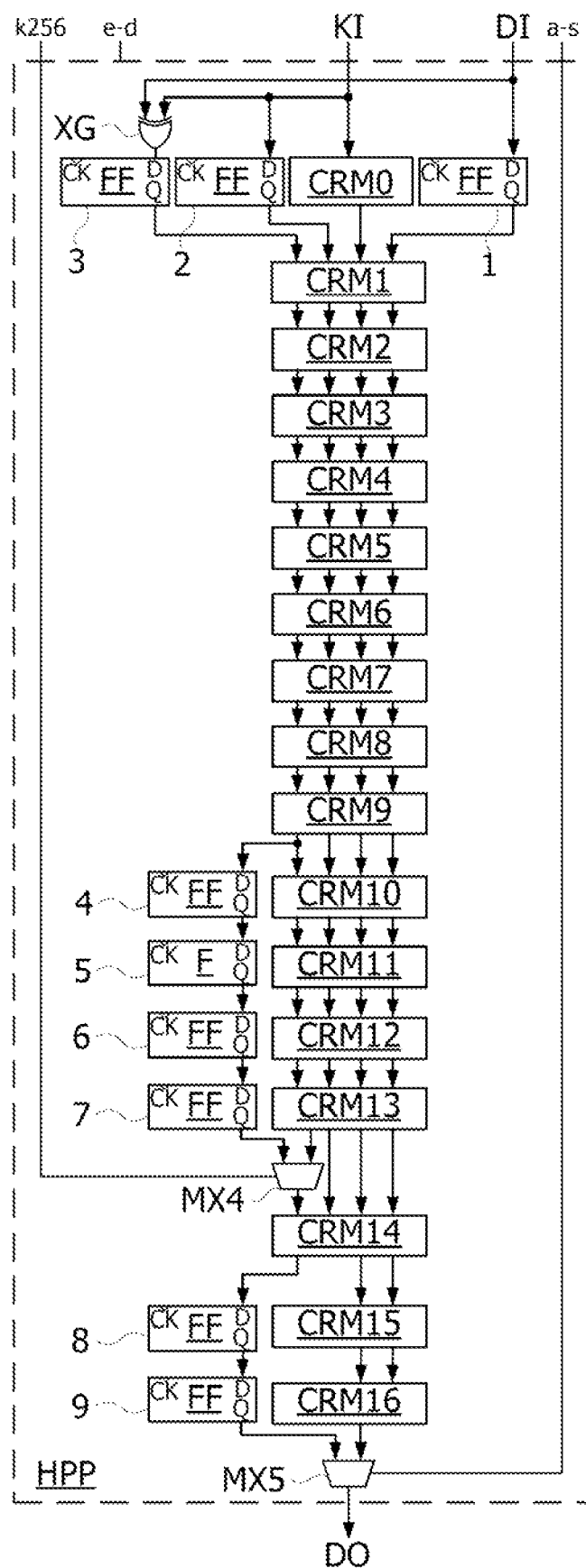
FIG. 3 is a block diagram of a hardware processing pipeline performing AES and SM4 encryption and decryption, according to some embodiments.

FIG. 3 is a block diagram illustrating a processing pipeline of a unified hardware accelerator HPP, according to some embodiments. Hardware accelerator HPP includes round stages CRM0-CRM16, sets of flip-flop or 128-bit registers FF 1-9, an XOR operator XG performing a bitwise Exclusive OR operation combining two 128-bit data blocks, and multiplexers MX4, MX5.

According to some embodiments, each of round stages CRM1-CRM14 performs one AES processing round and two SM4 processing rounds. Each of round stages CRM15 and CRM16 performs two SM4 processing rounds. Hardware accelerator HPP receives the input data block DI and key block KI which are combined by XOR operator XG. This operation corresponds to the first "AddRoundKey" of AES cipher. Data block DI and key block KI are also stored in respective registers 1, 2 during a first processing cycle. The output of operator XG is also stored in register 3 during the first processing cycle. During this first processing cycle, the key block KI is processed by the first round stage CRM0 to provide a first round key for SM4 cipher. The respective outputs of registers 1-3 and round stage CRM0 are connected to the second round stage CRM1. The round stages CRM1 to CRM13 are connected in cascade.

An AES data block output of the round stage CRM9 is also connected to a first register 4 of a group of four registers 4-7 connected in cascade. An AES data block output of the round stage CRM13 is connected with an output of the register 7 to respective inputs of multiplexer MX4. The output of multiplexer MX4 is connected to an AES data block input of the round stage CRM14. Other outputs of round stage CRM13 are connected to corresponding inputs of round stage CRM14. An AES data block output of round stage CRM14 is also connected to a first register 8 of a group of two registers 8, 9 connected in cascade. SM4 data and key outputs of round stage CRM14 are connected to corresponding inputs of round stage CRM15 and SM4 data and key outputs of round stage CRM15 are connected to corresponding inputs of round stage CRM16. The output of register 9 and a SM4 data output of round stage CRM16 are connected to respective inputs of multiplexer MX5 which provides an output data block DO to a data output of hardware accelerator HPP. Multiplexer MX4 is controlled by the signal k256 for selecting the size, 128 or 256 bits, of the AES key. Multiplexer MX5 is controlled by signal a-s selecting the cipher to be performed, AES or SM4.

Stages CRM1-CRM9 perform the 9 first rounds of AES cipher and the 18 first rounds of SM4 cipher. If AES cipher is selected to perform 10 rounds, then key block KI is a 128-bit block (signal a-s set to "AES" and signal k256 set for example to 0), and the AES data output of stage CRM9 is successively stored in registers 4-7 and provided to stage CRM14 by multiplexer MX4. If SM4 cipher is selected (signal a-s set to "SM4"), stages CRM10 to CRM13 successively perform 8 more rounds of SM4 cipher. If AES cipher is selected to perform 14 rounds, then key block KI is a 256-bit block (signal a-s set to "AES" and signal k256 set for example to 1), and stages CRM10 to CRM13 perform 4 more rounds of AES cipher, the AES data output of stage CRM13 being provided to stage CRM14 by multiplexer MX4. Depending on the case defined by the values of signals a-s and k256, stage CRM14 performs the last ($10^{th}$ or $14^{th}$) round of AES cipher or the $28^{th}$ round of SM4 cipher. The AES output data block provided by stage CRM14 is successively stored in registers 8, 9, whereas stages CRM15 and CRM16 perform the 4 last rounds ($29^{th}$ to $32^{nd}$) of SM4 cipher.

Figure 4:
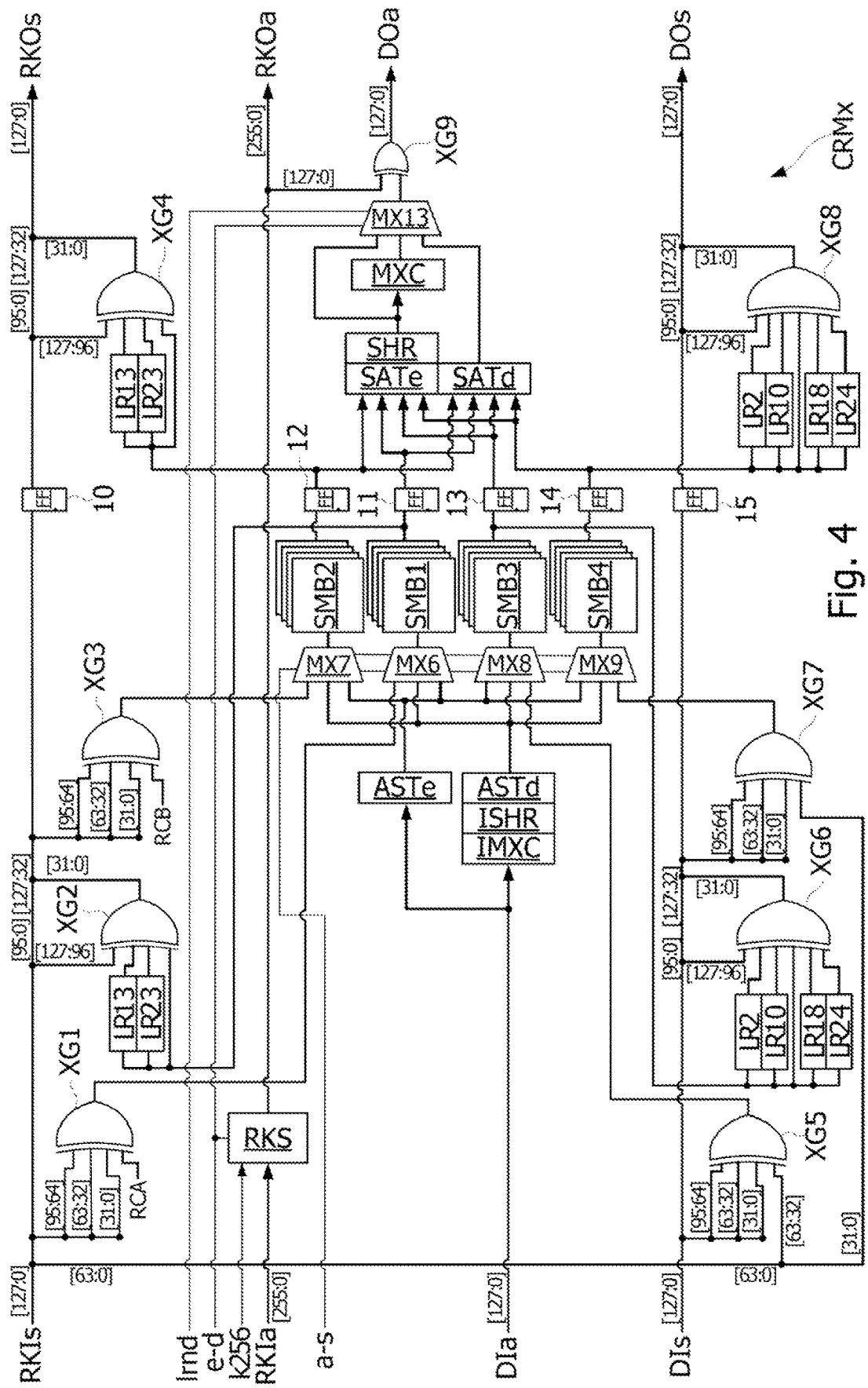
FIGS. 4 to 7 are block diagrams of stages of the hardware processing pipeline, according to some embodiments.

FIG. 4 is a block diagram illustrating one round stage CRMx according to some embodiments. Round stage CRMx may be one of the round stages CRM2 to CRM14. Round stage CRMx comprises 128-bit inputs for a data block DIs and a round key block RKIs to be processed by SM4 cipher, a 256-bit input for an AES round key block RKIa, and a 128-bit input for a data block DIa to be processed by AES cipher.

Round stage CRMx includes a SM4 round key schedule circuit comprising XOR operators XG1, XG2, XG3 and XG4 performing bitwise XOR operations, multiplexers MX6 and MX7, flip-flop or registers 10 and 12, register 10 storing a 128-bit block, register 12 storing a 32-bit word, two sets of two left rotators LR13 by 13 bits and LR23 by 23 bits, and two sets of four S-boxes SMB1, SMB2. The three least significant 32-bit words of the SM4 round key block are XORed together and with a 32-bit constant word RCA. The 32-bit word provided by operator XG1 is transmitted through multiplexer MX6 to the set of four S-boxes SBM1, each S-box receiving a respective byte extracted from this word. The 32-bit output word resulting from the S-box operations is provided to the inputs of one of the two sets of left rotators LR13 and LR23 and to an input of XOR operator XG2 receiving the outputs of the left rotators LR13 and LR23 and the bits [127:96] of the 128-bit round key block RKIs. In parallel, the round key block RKIs is arranged such that its bits [95:0] are shifted to the bit positions [127:32], and bits [31:0] of the arranged round key block is set to the 32-bit word provided by operator XG2, the rearranged round key block being stored in register 10. Then the 32-bits words [95:64], [63:32], [31:0] of the rearranged round key block are XORed together by the XOR operator XG3 with a 32-bit constant word RCB. Constants RCA and RCB depend on the round numbers currently executed and the cipher operation, encryption or decryption, currently performed, as selected by signal e-d. The 32-bit word at the output of operator XG3 is provided to a second set of four S-boxes SMB2 through multiplexer MX7. The 32-bit word provided by the S-box set SMB2 is stored in register 12 and then provided to XOR operator XG4, directly and respectively through the second set of two left rotators LR13 and LR23. The bits [127:96] of the round key block in register 10 are also provided to an input of operator XG4. In parallel, the 128-bit key block in register 10 is arranged such that the bits [95:0] are shifted to the bit positions [127:32], the bits [31:0] being set to the 32-bit word provided by operator XG4, the 128-bit word thus obtained being provided as a new 128-bit round key block RKOs at an output of round stage CRMx for a next SM4 round.

According to SM4 specifications, the constants RCA and RCB to be used for encryption by round stage CRMx are respectively equal to 32-bit constant words $CK_{2x}$ and $CK_{2x+1}$ for encryption, where x is the number of round stage CRMx and $CK_{i,j} = (4i+j) \times 7 \pmod{256}$, $CK_{i,j}$ being the $j^{th}$ byte of the constant word $CK_i$, with j=0, 1, 2, and 3, and i=0, 1, . . . , 31.

For decryption, constants RCA and RCB to be used by round stage CRMx are respectively $CK_{2(17-x)+1}$ and $CK_{2(17-x)}$. Round stage CRMx may be further configured to receive the round index x and to compute the constant values RCA and RCB as a function of signal e-d.

In summary, processing performed by operators XG1 and XG2 and S-box set SMB1 correspond to one round of SM4 key schedule and processing performed by operators XG3 and XG4 and S-box set SMB2 correspond to a subsequent round of SM4 key schedule.

Round stage CRMx further includes a SM4 round processing circuit including XOR operators XG5, XG6, XG7, XG8, multiplexers MX8 and MX9, flip-flop or registers 14 and 15, register 15 storing a 128-bit block, and register 14 storing one 32-bit word, two sets of four left rotation bit LR2 by 2 bits, LR10 by 10 bits, LR18 by 18 bits and LR24 by 24 bits, and two sets of four S-boxes SMB3, SMB4. The 32-bits words [95:64], [63:32], [31:0] of the 128-bit data block DIs received by round stage CRMx are XORed by operator XG5 with the 32-bit word [63:32] of SM4 round key RKIs. The 32-bit word provided by operator XG5 is transmitted to the inputs of the S-box set SMB3 through multiplexer MX8. The 32-bit word provided by S-box set SMB3 is transmitted to the inputs of a first one of the left bit shifter sets LR2, LR10, LR18 and LR24 and to one input of operator XG6. The outputs of the first left bit shifter set are connected to respective inputs of operator XG6 which also receives the 32-bit word [127:96] of the 128-bit input data block DIs. In parallel, the 128-bit input data block DIs is arranged such that its bits [95:0] are shifted to the bit positions [127:32], the bits [31:0] being set to the 32-bit word provided by operator XG6. Then the rearranged data block is stored in the register 15 and the 32-bits words [95:64], [63:32], [31:0] of the rearranged data block are XORed by operator XG7 with the 32-bit word [31:0] of the SM4 round key RKIs. The 32-bit word at the output of operator XG7 is provided to the S-box set SMB4 through multiplexer MX9. The 32-bit word provided by the S-box set SMB4 is stored in register 14 and then provided to operator XG8, directly and respectively through the second set of left rotators LR2, LR10, LR18 and LR24. The bits [127:96] in register 15 are also provided to an input of operator XG8. In parallel, the 128-bit word in register 15 is arranged such that the bits [95:0] are shifted to the bit positions [127:32], the bits [31:0] being set to the 32-bit word provided by operator XG8. The 128-bit data block DOs thus obtained being provided to an output of round stage CRMx for a next SM4 round. Multiplexers MX6-MX9 are controlled by signal a-s selecting the cipher, AES or SM4, and signal e-d specifies the cipher operation (encryption or decryption) to be performed.

In summary, processing performed by operators XG5 and XG6 and S-box set SMB3 correspond to one round of SM4 cipher and processing performed by operators XG7 and XG8 and S-box set SMB4 correspond to a subsequent round of SM4 cipher.

Round stage CRMx further include an AES round encryption processing circuit including affine transformation circuits ASTe, SATe, circuits SHR and MXC performing the ShiftRows and MixColumns operations of AES cipher, and a XOR operator XG9 performing the AddRoundKey operation of AES cipher (see NIST.FIPS.197). In addition, the AES round encryption processing circuit shares with the SM4 round key schedule circuit and the SM4 round processing circuit multiplexers MX6-MX9, S-box sets SMB1-SMB4, and registers 12 and 14.

A 128-bit data block DIa to be encrypted using AES cipher received by an input of round stage CRMx is first transformed by affine transformation circuit ASTe. Circuit ASTe is configured to apply the affine transformation M·b+c (e.g. according to equation (2)) to each byte of the input data block DIa. Then the 32-bit words of the 128-bit data block provided by circuit ASTe are transmitted and dispatched to the S-box sets SMB1-SMB4 through the multiplexers MX6-MX9. The 32-bit words provided by the S-box sets SMB1-SMB4 are stored in registers 11-14, respectively, and then provided in the form of a 128-bit data block to the affine transformation circuit SATe. Circuit SATe is configured to apply the affine transformation M1·b+c1 (e.g. according to equation (4)) to each byte of the received data block. The transformed 128-bit data block provided by circuit SATe is then successively processed by circuits SHR and MXC. In parallel, round stage CRMx receives an AES round key block RKIa of 128 or 256 bits, which is expanded by an AES round key schedule circuit RKS which outputs a 256-bit AES round key block RKOa, also to be used in a next round to derive a next round key. The 128-bit data block provided by circuit MXC and the lower 128 bits of round key block RKOa are combined by operator XG9. Operator XG9 outputs a 128-bit data block DOa which is provided to an output of round stage CRMx. Circuit RKS receives signal e-d and is configured to perform a round key expansion for encryption or an inverse round key expansion for decryption, as selected by signal e-d. Circuit RKS also receives signal k256 and is further configured to perform different key expansion and inverse key expansion processing depending on the size, 128 bits or 256 bits, of the AES key block KI.

Round stage CRMx further include an AES round decryption processing circuit including circuits IMXC and ISHR performing the inverse ShiftRows and inverse MixColumns operations of AES cipher, and affine transformation circuits ASTd, SATd. In addition, the AES round decryption processing circuit shares with the SM4 round key schedule circuit, the SM4 round processing circuit and the AES round encryption circuit, multiplexers MX6-MX9, S-box sets SMB1-SMB4, and registers 11-14.

The 128-bit data block DIa to be decrypted, received at an input of round stage CRMx is first successively processed by circuits IMXC and ISHR, and then transformed by affine transformation circuit ASTd. Circuit ASTd is configured to apply the affine transformation M·b+c (e.g. according to equation (3)) to each byte of the 128-bit data block provided by circuit ISHR. Then the 32-bit words of the 128-bit data block provided by circuit ASTd are transmitted and dispatched to the S-box sets SMB1-SMB4 through the multiplexers MX6-MX9. The 32-bit words provided by the S-box sets SMB1-SMB4 are stored in registers 11-14, respectively, and then provided in the form of a 128-bit data block to the affine transformation circuit SATd. Circuit SATd is configured to apply the affine transformation M1·b+c1 (e.g. according to equation (5)) to each byte of the received data block. The 128 bit-data block provided by circuit SATd and the 128-bit round key RKa provided by circuit RKS are combined by operator XG9 which outputs the 128-bit data block DOa. A multiplexer MX13 may be provided at the input of operator XG9 to select either the output of circuit MXC or the output of circuit SATd as a function of signal e-d selecting encryption or decryption.

Thus round stage CRMx includes 16 Sboxes (or four sets of four S-boxes) such that it can perform two rounds of SM4 cipher and SM4 key schedule or one round of AES cipher, cipher being applied simultaneously to the four 32-bit words of a 128-bit input data block DIs or DIa. Due to the presence of the registers 10-15, round stage CRMx produces output data in one clock cycle since any input-to-output path crosses one register 10-15. It results that the hardware processing pipeline HDD encrypts or decrypts a 128-bit data block in 17 clock cycles for SM4 and AES ciphers (one cycle in stage CRM0 or registers 1-3 and 16 cycles in round stages CRM1-CRM16). In addition, the hardware processing pipeline HDD can start a data block encryption or decryption at each clock cycle.

According to an embodiment, signals a-s, e-d and k256 are stored at each round, such that the cipher process (SM4/AES, key size 128/256 bits, encryption/decryption) started at each clock cycle may also change at each clock cycle.

Round stage CRM (FIG. 2) may be implemented by a round stage derived from round stage CRMx and further comprising derivation paths activated by a round number signal to bypass circuit IMXC when the round number is set to one and to bypass circuit MXC when the round number signal is set to 10 or 14, and to supply round number dependent values for constant data RCA, RCB. According to some embodiments, round stage CRMx comprises a multiplexer to bypass circuit IMXC as a function of a signal indicating whether the first AES round is currently performed or not. Multiplexer MX13 may further comprise another input connected to the output of circuit SHR to bypass circuit MXC as a function of a signal Irnd indicating whether the last AES round (round 10 or 14) is currently performed or not.

Figure 5:
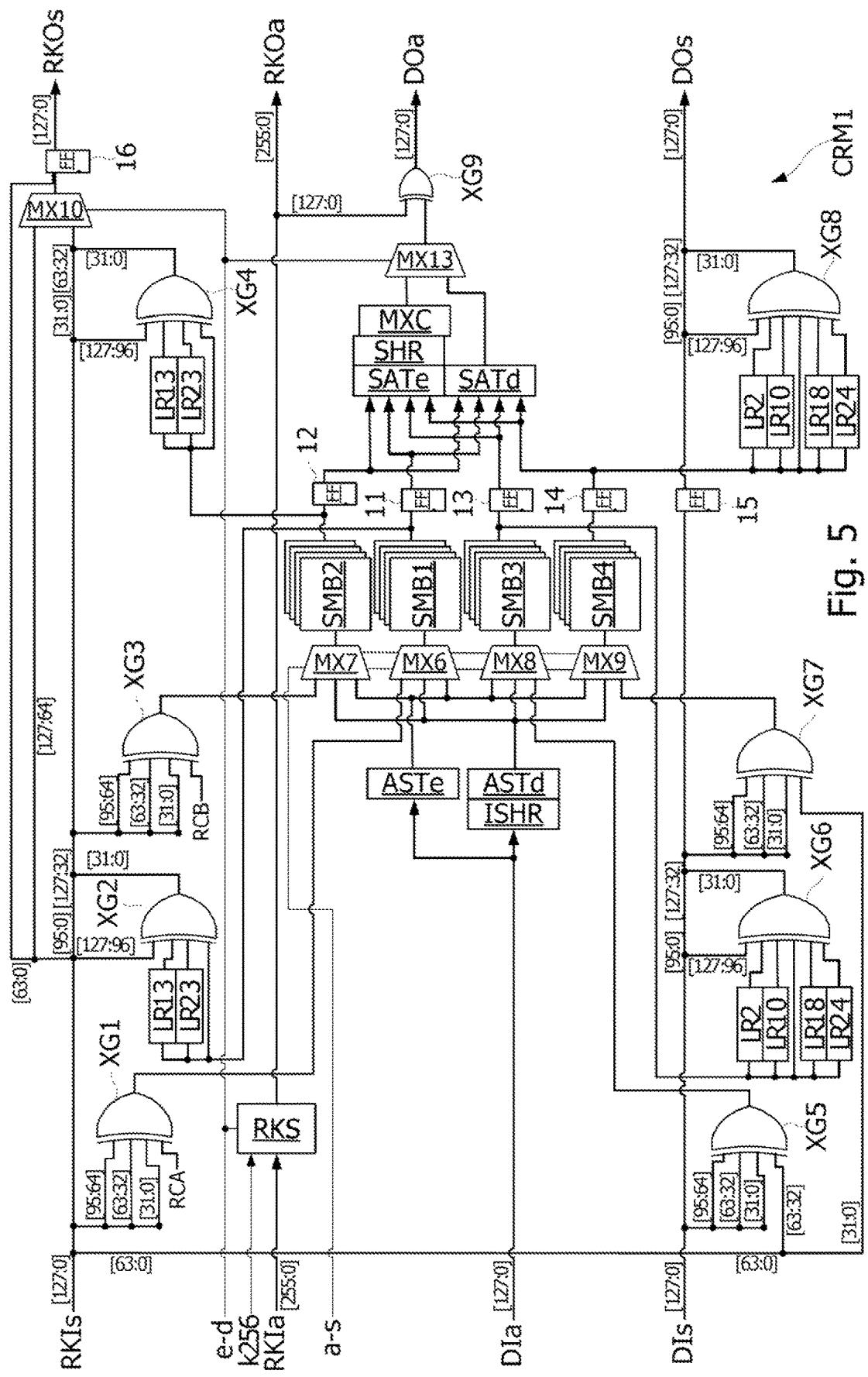

FIG. 5 shows an example of round stage CRM1 (shown in FIG. 3). Round stage CRM1 differs from round stage CRMx in that it does not comprise the circuit IMXC and has a modified SM4 round key schedule circuit. The SM4 round key schedule circuit of round stage CMR1 comprises the operators XG1, XG2, XG3, XG4, the two sets of left rotators LR13, LR23, a register 16 and a multiplexer MX10 controlled by signal e-d, register 10 being removed. The output of S-box set SMB1 is directly provided to inputs of operator XG4 and the second set of left rotators LR13, LR23. The output of operator XG4 is concatenated to form the bits [31:0] of a 64-bit word with the 32-bit word present at the output of operator XG2. Multiplexer MX10 is connected to select either the bits [127:64] of the round key RKIs, for decryption or for encryption, the 64-bit word formed by the 32-bit word provided by XOR operator XG4 and the bits 32-bit word provided by XOR operator XG2. The bit positions [63:0] of register 16 receive the output of multiplexer MX10, and the bit positions [127:64] of register 16 receive the bits [63:0] of the round key RKIs. Register 16 provides the output round key RKOs. When signal e-d selects decryption, output round key RKOs is equal to input round key RKIs with the words [63:0] and [127:64] swapped to recover the original decryption keys swapped by stage CRM0.

Round stage CRM14 (FIG. 3) may be implemented by round stage CRMx modified by removing circuit MXC or using multiplexer MX13 with three inputs to bypass circuit MXC at the last AES round, i.e. when a signal Irnd is set.

Figure 6:
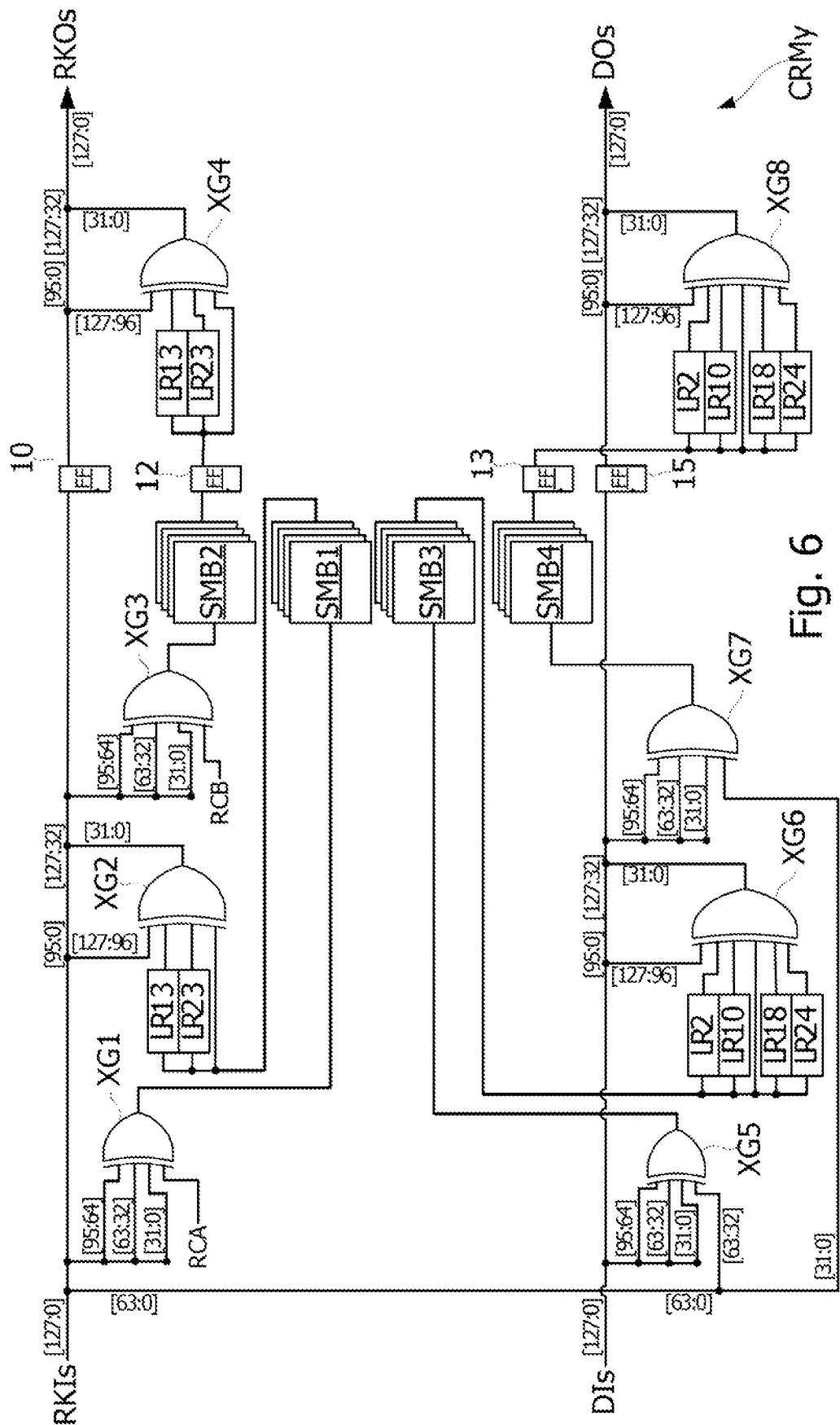

FIG. 6 is a block diagram illustrating a round stage CRMy according to some embodiments. Round stage CRMy may be one of the round stages CRM15, CRM16 only performing a SM4 encryption or decryption processing. Round stage CRMy is derived from round stage CRMx such that the AES round encryption and decryption processing circuits and AES round key schedule circuit RKS are removed. Since the S-box sets SMB1-SMB4 are not shared between AES and SM4 ciphers, multiplexers MX6-MX9 may also be removed. According to other embodiments, round stage CRMy may be implemented by round stage CRMx, with control signal a-s forced to the value selecting SM4 cipher, with inputs RKIa and DIa not connected, and with outputs RKIa and DOa not connected.

Since SM4 key scheduling is not necessary for the last SM4 round, the SM4 round stage CRM16 may be implemented by removing the SM4 round key schedule circuit in round stage CMRy.

Figure 7:
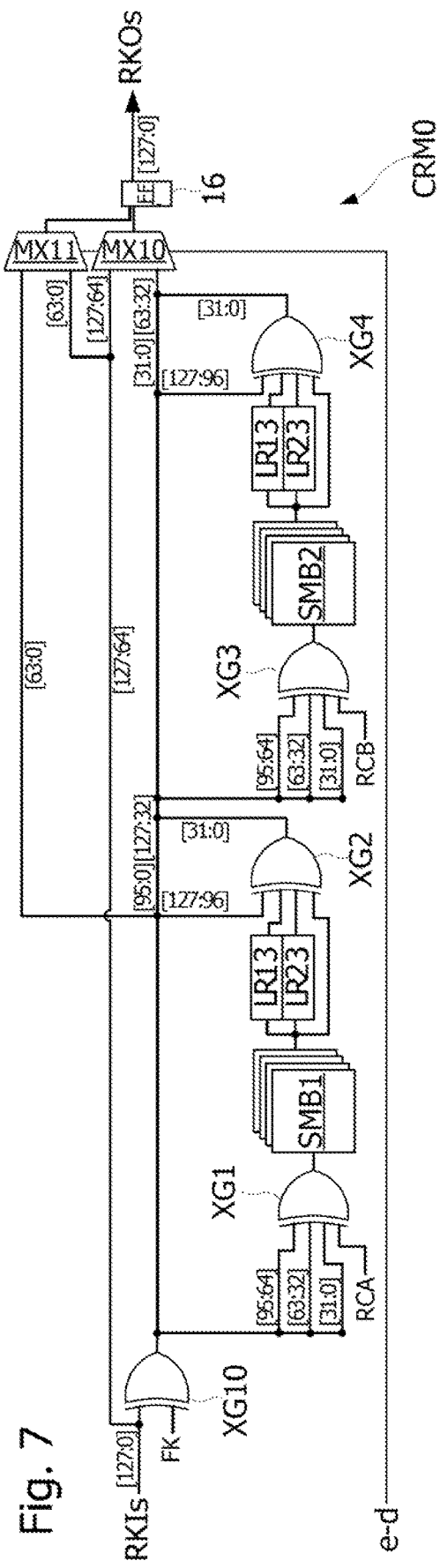

FIG. 7 is a block diagram illustrating the round stage CRM0 according to some embodiments. Round stage CRM0 is derived from round stage CRM1 such that it only comprises the SM4 round key schedule circuit of round stage CMR1. Round stage CRM0 further includes a XOR operator XG10 and a multiplexer MX11 controlled by signal e-d. The operator XG10 is placed in the circuit to receive input round key RKIs and a 128-bit data block FK to mask the round key with data block FK. The output of operator XG10 is connected to inputs of operators XG1, XG2, XG3 and XG4. Bits [127:64] and [63:0] of input round key RKIs are provided to multiplexers MX10 and MX11 respectively. Multiplexer MX11 receives on another input bits [63:0] of the output of operator XG10. The output of multiplexer MX11 are stored in register 16 at bit positions [127:64] whereas the output of multiplexer MX10 are stored at bit positions [63:0] in register 16. Data block FK is a system parameter of the SM4 cipher set to 0xA3B1BAC656AA3350677D9197627022DC. When signal e-d selects decryption, the output round key RKOs corresponds to the input key RKIs with the words [63:0] and [127:64] swapped.

Figure 8:
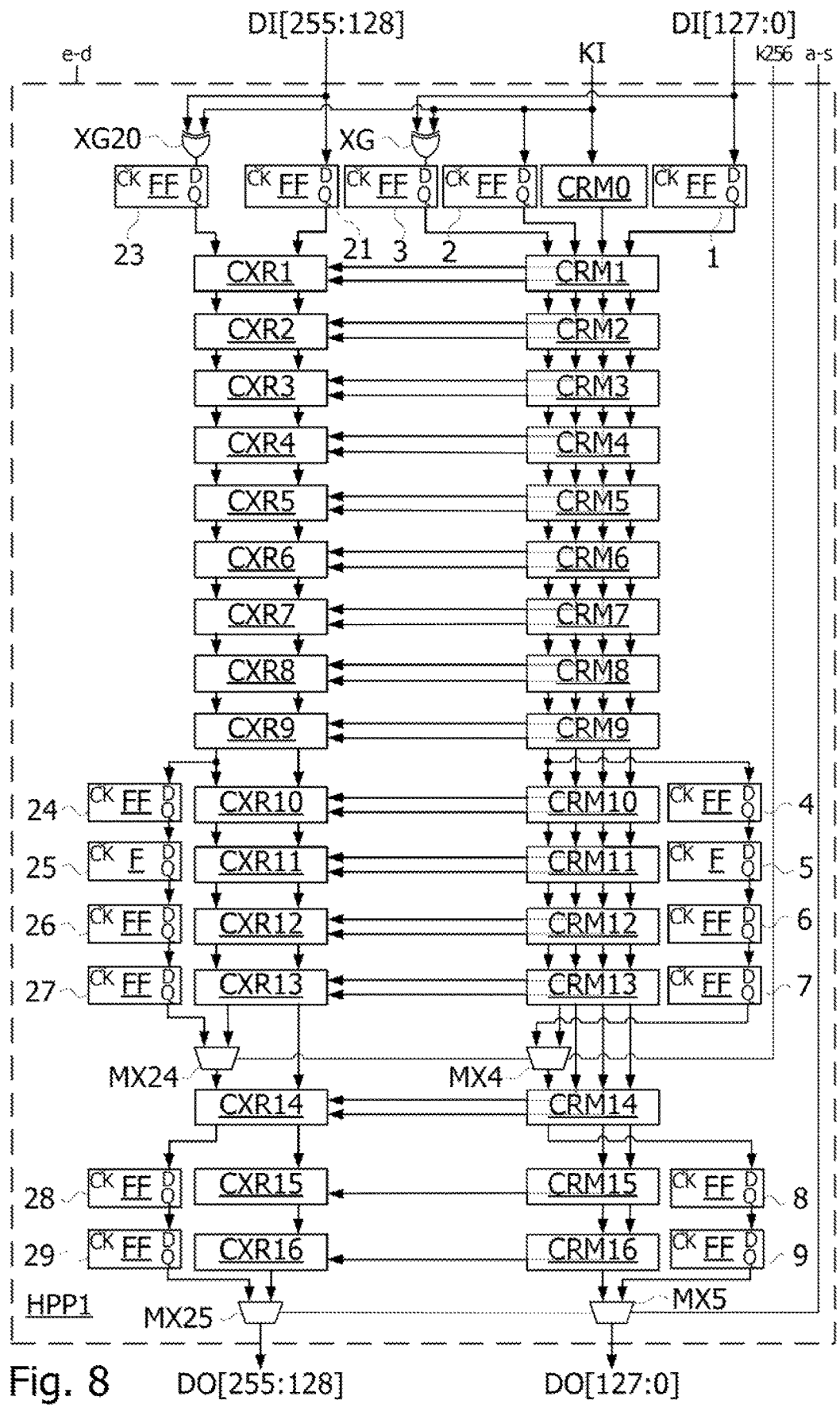
FIG. 8 is a block diagram of a hardware processing pipeline performing AES and SM4 encryption and decryption, according to other embodiments.

FIG. 8 is a block diagram illustrating another embodiment HPP1 of the hardware pipeline HPP. Hardware pipeline HPP1 differs from hardware pipeline HPP in that it comprises an additional processing pipeline receiving a second 128-bit data block, e.g. DI[255:128], and including round stages CXR1-CRX16, an XOR operator XG20, multiplexers MX24, MX25 and registers 21 and 23-29. The additional processing pipeline has the same structure as the processing pipeline of hardware pipeline HPP. The additional processing pipeline receives a second 128-bit data block, e.g. DI[255:128], whereas the principal processing pipeline receives the 128-bit data block DI[127:0].

Each of round stages CRX1-CRX14 performs one AES processing round and two SM4 processing rounds. Each of round stages CRX15 and CRX16 performs two SM4 processing rounds. Round stages CRX1-CRX16 differ from round stages CRM1-CRM16 in that they do not perform round key scheduling but receive a respective round key from the corresponding round stage CRM1-CRM16. The additional processing pipeline receives the input data block DI[255:128] and key block KI which are combined by XOR operator XG20. This operation corresponds to the first "AddRoundKey" of AES cipher. Data block DI[255:128] is also stored in register 21 during a first processing cycle. The output of operator XG is also stored in register 23 during the first processing cycle. The respective outputs of registers 21, 23 are connected to round stage CRX1. The round stages CRX1 to CRX13 are connected in cascade. An AES data block output of round stage CRX9 is also connected to a first register 24 of a group of four registers 24-27 connected in cascade. An AES data block output of round stage CRX13 is connected with an output of register 27 to respective inputs of multiplexer MX24. The output of multiplexer MX24 is connected to an AES data block input of the round stage CRX14. Other outputs of round stage CRX13 are connected to corresponding inputs of round stage CRX14. An AES data block output of round stage CRX14 is also connected to a first register 28 of a group of two registers 28, 29 connected in cascade. SM4 data output of round stage CRX14 is connected to a corresponding input of round stage CRX15 and SM4 data output of round stage CRX15 is connected to a corresponding input of round stage CRX16. The output of register 29 and a SM4 data output of round stage CRX16 are connected to respective inputs of multiplexer MX25 which provides an output data block DO[255:128] to a data output of hardware accelerator HPP1. Multiplexer MX24 is controlled by the signal k256 for selecting the size, 128 or 256 bits, of the AES key. Multiplexer MX25 is controlled by signal a-s selecting the cipher to be performed, AES or SM4.

Stages CRX1-CRX9 perform the 9 first rounds of AES cipher and the 18 first rounds of SM4 cipher. If AES cipher is selected to perform 10 rounds, then key block KI is a 128-bit block (signal a-s set to "AES" and signal k256 set for example to 0), and the AES data output of stage CRX9 is successively stored in registers 24-27 and provided to stage CRX14 by multiplexer MX24. If SM4 cipher is selected (signal a-s set to "SM4"), stages CRX10 to CRX13 successively perform 8 more rounds of SM4 cipher. If AES cipher is selected to perform 14 rounds, then key block KI is a 256-bit block (signal a-s set to "AES" and signal k256 set for example to 1), and stages CRX10 to CRX13 perform 4 more rounds of AES cipher, the AES data output of stage CXR13 being provided to stage CXR14 by multiplexer MX24. Depending on the case defined by the values of signals a-s and k256, stage CRX14 performs the last ($10^{th}$ or $14^{th}$) round of AES cipher or the $28^{th}$ round of SM4 cipher. The AES output data block provided by stage CRX14 is successively stored in registers 28, 29, whereas stages CRX15 and CRX16 perform the 4 last rounds ($29^{th}$ to $32^{nd}$) of SM4 cipher.

According to some embodiments, the hardware pipeline comprises a plurality of additional processing pipelines including the round stages CRX1-CRX16 to simultaneously process a plurality of 128-bit data blocks.

Figure 9:
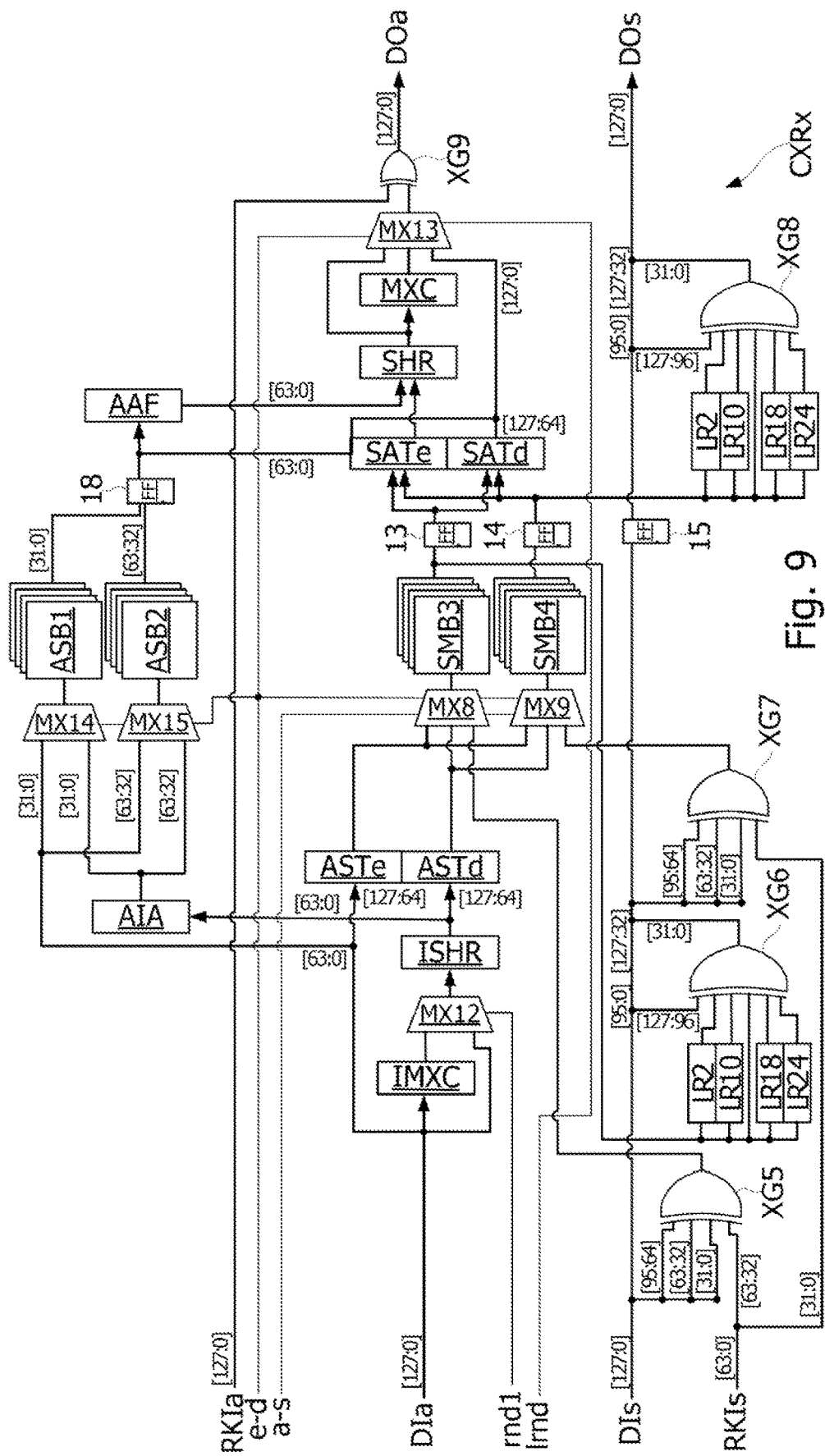
FIG. 9 is a block diagram of some embodiments of one stage of the hardware processing pipeline of FIG. 8.

FIG. 9 is a block diagram illustrating one embodiment CXRx of the round stages CXR2-CXR13. The round stage CXRx differs from the round stage CRMx (FIG. 4) in that it does not comprise SM4 and AES round key schedule circuits and thus it does not comprise the two sets of four S-boxes SMB1, SMB2. In addition, circuits SATe and SATd only process words of 64 bits. To perform all the AES S-box operations, round stage CXRx comprises an AES affine circuit AAF, an AES inverse affine circuit AIA, two sets of four multiplicative inverse circuits ASB1, ASB2, a 64-bit register 18 and multiplexers MX14, MX15 controlled by signal e-d. Circuits AAF, and AIA are provided to use the same AES S-boxes for encryption and decryption. The SM4 input data block DIs and the bits [127:64] of the AES input data block DIa are processed by a same processing circuit as in round stage CRMx. Bits [63:0] of AES input data block DIa are divided into two 32-bits words that are transmitted respectively to multiplexers MX14, MX15. Bits [63:0] of the data block provided by circuit ISHR are transmitted to circuit AIA, and the 64-bit data block provided by circuit AIA are divided into two 32-bits words that are transmitted respectively to multiplexers MX14, MX15. The word [31:0] provided by multiplexer MX14 is processed by the multiplicative inverse circuits ASB1, and the word [63:31] provided by multiplexer MX15 is processed by the multiplicative inverse circuits ASB2. Each multiplicative inverse circuit in the sets ABS1, ABS2 computes a Galois field $GF(2^8)$ multiplicative inverse in the AES field of an input byte. The words provided by the sets ASB1, ASB2 of multiplicative inverse circuits are stored in register 18, respectively at bit positions [31:0] and [63:32]. The 64-bit word stored in register 18 is provided to circuit AAF and forms with the 64-bit output word of circuit SATd a 128-bit data block which is provided to multiplexer MX13. The 64-bit word provided by circuit AAF forms with the 64-bit output word of circuit SATe a 128-bit data block which is provided to circuit SHR.

Round stage CXR1 may be derived from round stage CXRx by removing circuit IMXC or adding a multiplexer MX12 selecting the input data block DIa or the output of circuit IXMC as a function of signal rnd1 indicating whether the first round is currently running or not.

Round stage CXR14 may be derived from round stage CRMx by removing circuit MXC or adding an entry to multiplexer MX13 for selecting the output of circuit MXC or the output of circuit SHR as a function of signal Irnd indicating whether the last AES round is currently running or not.

Round stages CXR15 and CXR16 may be derived from round stage CRMy by removing the SM4 round key schedule circuit of CRMy.

Figure 10:
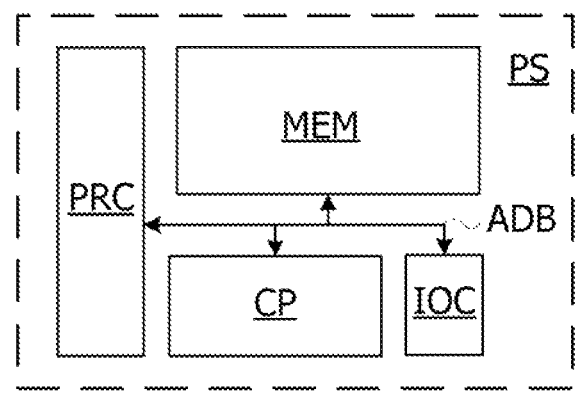
FIG. 10 is a block diagram illustrating one embodiment of a processing system including the unified hardware accelerator performing AES and SM4 encryption and decryption.

FIG. 10 is a block diagram illustrating one embodiment of a processing system PS which may include the hardware accelerator HWA or the hardware pipeline HPP. The processing system PS may include one or more processors PRC, such as a microprocessor or microcontroller, a data and address bus ADB coupled to the processor PRC, and coupled to the bus ADB, memories MEM, one or more input/output circuits IOC, one or more hardware accelerator circuits CP which may include the hardware accelerator HWA or the hardware pipeline HPP. Memories MEM may include a volatile memory, for example a RAM-type ("Random Access Memory") memory containing volatile application data, a non-volatile memory, for example an EEPROM or Flash memory, containing non-volatile data and application programs, and possibly a read-only memory (or ROM memory) which may store an operating system of the processor PRC. The operating system can also be stored in the non-volatile memory.

The communication interface circuit IOC may include any suitable type, number, and/or configuration of wired and/or wireless devices that transmit information from processing system PS to another processing or storage system (not shown) and/or receive information from another processing or storage system (not shown). Communications devices IOC may receive user inputs, and parameters and cause user inputs and parameters to be stored in memories M1.

The processing system PS, or only the hardware accelerator HWA or the hardware pipeline HPP may be integrated into an integrated circuit or in a system-on-chip (SoC).

Figure 11:
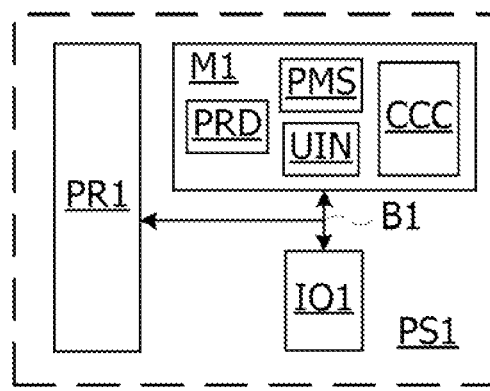
FIG. 11 is a block diagram illustrating one embodiment of a processing system for generating a representation of a circuit component.

FIG. 11 is a block diagram illustrating one embodiment of a processing system PS1 for processing or generating a representation of a circuit component which may include the hardware accelerator HWA or the hardware pipeline HPP. Processing system PS1 includes one or more processors PR1, one or more memories M1, and one or more communications devices IO1. Processors PR1, memories M1, and communications devices IO1 communicate using any suitable type, number, and/or configuration of wired and/or wireless connections B1.

Processors PR1 execute instructions of one or more processes PRD stored in a memory M1 to process and/or generate circuit component representations CCC responsive to user inputs UIN and parameters PMS. Processes PRD may be any suitable electronic design automation (EDA) tool or portion thereof used to design, simulate, analyze, and/or verify electronic circuitry and/or generate photomasks for electronic circuitry. Representations CCC includes data that describes all or portions of circuits HWA, HPP, CRM, CRM0-CRM16, CRMx, CRMy, as shown in FIGS. 2-6.

Memory M1 includes any suitable type, number, and/or configuration of non-transitory computer-readable storage media that stores processes PRD, user inputs UIN, parameters PMS, and circuit components CCC.

Communications devices IO1 may include any suitable type, number, and/or configuration of wired and/or wireless devices that transmit information from processing system PS1 to another processing or storage system (not shown) and/or receive information from another processing or storage system (not shown). For example, communications devices IO1 may transmit circuit component CCC to another system. Communications devices IO1 may receive processes PRD, user inputs UIN, parameters PRD, and/or circuit component CCC and cause processes PRD, user inputs UIN, parameters PMS, and/or circuit component CCC to be stored in memory M1.

The illustrations described herein are intended to provide a general understanding of the structure of various embodiments. These illustrations are not intended to serve as a complete description of all of the elements and features of apparatus, processors and systems that utilizes the structures or methods described therein. Many other embodiments or combinations thereof may be apparent to those of ordinary skills in the art upon reviewing the disclosure by combining the disclosed embodiments. Other embodiments may be utilized and derived from the disclosure, such that structural and logical substitutions and changes may be made without departing from the scope of the disclosure.

For example, the circuit of FIG. 1 may be implemented alone to perform S-box operations for SM4 cipher and for another symmetric block cipher also using $8\times8$ S-boxes, such as ARIA and Camellia. The affine transformations AST, SAT are then defined as a function of the other symmetric block cipher combined with SM4 cipher.

The principle of circuit of FIG. 1 may be adapted to another combination of symmetric block ciphers, to be used in hardware accelerator circuits implementing SM4 cipher combined with another symmetric block cipher.

Further, the disclosure and the illustrations are to be considered as illustrative rather than restrictive, and the appended claims are intended to cover all such modifications, enhancements and other embodiments, which fall within the true spirit and scope of the description. Thus, the scope of the following claims is to be determined by the broadest permissible interpretation of the claims and their equivalents, and shall not be restricted or limited by the foregoing description.

What is claimed is:

1. A method of performing cipher operations, comprising:
selecting, by a cipher accelerator circuit, whether to bypass a first affine transformation and a second affine transformation to process a first input data block according to an SM4 cipher and using an SM4 S-box table to produce a first partially SM4 ciphered data block and a first SM4 substituted data block that is supplied to an adjacent SM4 round processing circuit;
based on selecting to not bypass the first affine transformation, performing, by the cipher accelerator circuit, the first affine transformation applied to the first input data block to obtain a first transformed data block, wherein the first affine transformation includes multiplication of input data block by a first matrix and addition of a first translation vector;
based on selecting to not bypass the first affine transformation, performing, by the cipher accelerator circuit, a first byte substitution (S-box) operation according to the SM4 cipher and using the SM4 S-box table, the SM4 S-box operation being applied to the first transformed data block to obtain a substituted data block; and
based on selecting to not bypass the first affine transformation, performing, by the cipher accelerator circuit, the second affine transformation applied to the substituted data block to obtain a second transformed data block, wherein the second affine transformation includes multiplication of the substituted data block by a second matrix and addition of a second translation vector, and wherein the first and second matrices and the first and second translation vector are defined such that the second transformed data block is equal to the first input data block processed by a second S-box operation according to another symmetric cipher using S-box tables.

2. The method of claim 1, wherein the second S-box operation is an Advanced Encryption Standard (AES) S-box operation.

3. The method of claim 1, wherein:
the first input data block comprises a plurality of bytes;
performing of the first affine transformation on the first input data block comprises concurrently applying the first affine transformation to each byte of the first input data block, to generate bytes of the first transformed data block;
performing of the SM4 S-box operation on the first transformed data block comprises concurrently applying the SM4 S-box operation to each byte of the first transformed data block, using a respective SM4 S-box table, to generate bytes of the substituted data block; and
performing of the second affine transformation on the substituted data block, comprises concurrently applying the second affine transformation to each byte of the substituted data block, to generate bytes of the second transformed data block.

4. The method of claim 3, wherein the SM4 S-box tables used by the cipher accelerator circuit to perform the SM4 S-box operation applied to the first transformed data block are S-box tables of two adjacent SM4 round circuits, each round circuit being configured to perform one round according to SM4 cipher and to perform one round expansion operation of an SM4 round key according to a SM4 round key schedule process.

5. The method of claim 1, wherein the cipher operations performed by a cipher accelerator circuit comprise encryption and decryption operations, each operation being associated with respective specific first and second affine transformations.

6. The method of claim 1, comprising:
based on selecting to bypass the first affine transformation, applying, by the cipher accelerator circuit, to a second input data block a first SM4 cipher operation to obtain a second partially SM4 ciphered data block;
based on selecting to bypass the first affine transformation, bypassing, by the cipher accelerator circuit, the first affine transformation;
based on selecting to bypass the first affine transformation, applying, by the cipher accelerator circuit, the SM4 S-box operation to the second partially SM4 ciphered data block to obtain a second SM4 substituted data block; and based on selecting to bypass the first affine transformation, bypassing, by the cipher accelerator circuit, the second affine transformation, the second SM4 substituted data block being supplied to an adjacent SM4 round processing circuit.

7. A cipher accelerator circuit, comprising:
a first affine transformation circuit to, based on a first selection, generate a first transformed data block from a first input data block, and to, based on a second selection, be bypassed to generate a first partially SM4 ciphered data block, wherein the first affine transformation circuit is configured to perform multiplication of the first input data block by a first matrix and addition of a first translation vector;
a SM4 byte substitution (S-box) circuit to perform a first S-box) operation according to a SM4 cipher and using a SM4 S-box table, the SM4 S-box operation to be applied to the first transformed data block to obtain a substituted data block; and
a second affine transformation circuit to, based on the first selection, generate a second transformed data block from the substituted data block, and to, based on the second selection, be bypassed to provide a first SM4 substituted data block to an adjacent SM4 round processing circuit, wherein the second affine transformation circuit is configured to perform multiplication of the substituted data block by a second matrix and addition of a second translation vector, and wherein the first and second affine transformations circuits are configured such that the second transformed data block is equal to the first input data block processed by a second S-box operation according to another symmetric cipher using S-box tables.

8. The cipher accelerator circuit of claim 7, wherein the second S-box operation is an Advanced Encryption Standard (AES)S-box operation.

9. The cipher accelerator circuit of claim 7, wherein:
the first input data block comprises a plurality of bytes;
the first affine transformation circuit comprises a plurality of first byte affine transformation circuits each configured to apply the first affine transformation to a respective byte of the first input data block, to generate bytes of the first transformed data block;
the SM4 S-box circuit comprises a plurality of SM4 byte S-box circuits each configured to apply a SM4 byte S-box operation to a respective byte of the first transformed data block, using a respective SM4 byte S-box table, to generate bytes of the substituted data block; and
the second affine transformation circuit comprises a plurality of second byte affine transformation circuits each configured to apply the second affine transformation to a respective byte of the substituted data block, to generate bytes of the second transformed data block.

10. The cipher accelerator circuit of claim 9, comprising two adjacent SM4 round circuits, each SM4 round circuit being configured to perform one round according to SM4 cipher using a first set of SM4 S-box tables and to perform one round expansion of an SM4 round key according to a SM4 key schedule process using a second set of SM4 S-box tables, the first and second set of S-box tables of each adjacent SM4 round circuits being used concurrently to apply the SM4 S-box operation to each byte of the first transformed data block.

11. The cipher accelerator circuit of claim 7, configured to:

based on the second selection, apply a second input data block to a first SM4 cipher operation to obtain a second partially SM4 ciphered data block;
based on the second selection, bypass the first affine transformation;
based on the second selection, apply the SM4 S-box operation to the second partially SM4 ciphered data block to obtain a second SM4 substituted data block; and
based on the second selection, bypass the second affine transformation, the second SM4 substituted data block being supplied to the adjacent SM4 round processing circuit.

12. The cipher accelerator circuit of one of claim 7, including a first processing pipeline comprising a plurality of round stages, each round stages being configured to perform in two clock cycles two SM4 rounds and two SM4 round key schedule and one round of the other symmetric cipher.

13. The cipher accelerator circuit of claim 12, wherein the round stages of the first processing pipeline are configured to concurrently process respective data blocks according to respective selection signals selecting encryption or decryption and selecting a one of the first selection and the second selection.

14. The cipher accelerator circuit of claim 12, including a plurality of processing pipelines each receiving a respective input data block to be processed using a same cipher key.

15. A computer-readable medium storing a representation of a circuit component comprising:
a first affine transformation circuit to, based on a first selection, generate a first transformed data block from a first input data block, and to, based on a second selection, be bypassed to generate a first partially SM4 ciphered data block, wherein the first affine transformation circuit is configured to perform multiplication of the first input data block by a first matrix and addition of a first translation vector;
a SM4 substitution box (S-box) circuit to perform a first byte substitution (S-box) operation according to a SM4 cipher and using a SM4 S-box table, the SM4 S-box operation to be applied to the first transformed data block to obtain a substituted data block; and
a second affine transformation circuit to, based on the first selection, generate a second transformed data block from the substituted data block, and to, based on the second selection, be bypassed to provide a first SM4 substituted data block to an adjacent SM4 round processing circuit, wherein the second affine transformation circuit is configured to perform multiplication of the substituted data block by a second matrix and addition of a second translation vector, and wherein the first and second affine transformations circuits are configured such that the second transformed data block is equal to the first input data block processed by a second S-box operation according to another symmetric cipher using S-box tables.

16. The computer-readable medium of claim 15, wherein the second S-box operation is an Advanced Encryption Standard (AES)S-box operation.

17. The computer-readable medium of claim 15, wherein:
the first input data block comprises a plurality of bytes;
the first affine transformation circuit comprises a plurality of first byte affine transformation circuits each configured to apply the first affine transformation to a respective byte of the first input data block, to generate bytes of the first transformed data block;

the SM4 S-box circuit comprises a plurality of SM4 byte S-box circuits each configured to apply a SM4 byte S-box operation to a respective byte of the first transformed data block, using a respective SM4 byte S-box table, to generate bytes of the substituted data block; and the second affine transformation circuit comprises a plurality of second byte affine transformation circuits each configured to apply the second affine transformation to a respective byte of the substituted data block, to generate bytes of the second transformed data block.

18. The computer-readable medium of claim 17, wherein the circuit component further comprises two adjacent SM4 round circuits, each SM4 round circuit being configured to perform one round according to SM4 cipher using a first set of SM4 S-box tables and to perform one round expansion of an SM4 round key according to a SM4 key schedule process using a second set of SM4 S-box tables, the first and second set of S-box tables of each adjacent SM4 round circuits being used concurrently to apply the SM4 S-box operation to each byte of the first transformed data block.

19. The computer-readable medium of claim 15, wherein the circuit component is further configured to:

based on the second selection, apply a second input data block to a first SM4 cipher operation to obtain a second partially SM4 ciphered data block;

based on the second selection, bypass the first affine transformation;

based on the second selection, apply the SM4 S-box operation to the second partially SM4 ciphered data block to obtain a second SM4 substituted data block; and based on the second selection, bypass the second affine transformation, the second SM4 substituted data block being supplied to the adjacent SM4 round processing circuit.

20. The computer-readable medium of claim 15, wherein the circuit component comprises a first processing pipeline comprising a plurality of round stages, each round stages being configured to perform in two clock cycles two SM4 rounds and two SM4 round key schedule and one round of the other symmetric cipher.

* * * * *